United States Patent [19]

Dotson et al.

[11] Patent Number: 4,692,168

[45] Date of Patent: Sep. 8, 1987

[54] FLAMMABLE BARRIER WRAP FOR SOLID FUEL/FIRESTARTER COMPOSITION

[75] Inventors: Duane L. Dotson, Mountain Lakes; Alex Forschirm, Parsippany, both of N.J.

[73] Assignee: Celanese Corporation, New York, N.Y.

[21] Appl. No.: 872,590

[22] Filed: Jun. 10, 1986

[51] Int. Cl.[4] .................... C10L 7/00

[52] U.S. Cl. .................... 44/7.1; 44/7.3; 44/7.6; 44/7.7

[58] Field of Search .................... 44/7.1–7.7

[56] References Cited

U.S. PATENT DOCUMENTS 3,231,345 1/1966 Wilder .................... 44/7
3,231,346 1/1966 Wilder .................... 44/7
3,232,720 2/1966 Kepple .................... 44/7
3,232,721 2/1966 Coyner .................... 44/7
3,261,346 7/1966 Waddell et al. .................... 126/59.5
3,262,765 7/1966 Wimmer .................... 44/7.7

FOREIGN PATENT DOCUMENTS 54-469 6/1979 Japan .
57-13 1/1981 Japan .

*Primary Examiner*—Peter A. Nelson
*Attorney, Agent, or Firm*—Depaoli & O'Brien

[57] ABSTRACT

A novel package for a solid or gelled heating fuel comprises a flammable plastic film wrapped around the shaped fuel. Preferably, the plastic film is nonporous to prevent sublimation of the fuel.

20 Claims, 2 Drawing Figures

14 12 13 11 10

FLAMMABLE BARRIER WRAP FOR SOLID FUEL/FIRESTARTER COMPOSITION

BACKGROUND OF THE INVENTION

This invention relates to a novel means of packaging solid or gelled heating fuels.

Solid or gelled heating fuels have wide potential application as convenient, easily handled and comparatively safe heat sources. Gelled heating fuels in portable form can be employed in civilian uses such as camping, outdoor cooking of all sorts, fire-starting, emergency heat and light supplies, and the like. Gelled heating fuels are also essential for military use, including the heating of field rations, etc.

The most widely accepted forms of gelled heating fuels at present are ethyl alcohol gelled with a metallic soap and trioxane formed from compaction of powdered trioxane with or without compaction aids such as magnesium stearate and an organic binder, or a trioxane melt. Compacted or melted, and then molded or otherwise shaped, gelled heating fuel such as trioxane in the shape of pellets is advantageous in view of the lack of toxicity and ease of ignition of this fuel. The low luminosity of trioxane fuel is especially useful for military applications. However, gelled heating fuels have not proven to be fully satisfactory. Trioxane fuel pellets and the like have a rather low caloric value on the order of 4,000 kcal/kg. Moreover, although the low luminosity of trioxane and other oxygenated hydrocarbon gelled fuels may be advantageous in military field applications, the rather non-luminous flame is not easily detected and may lead to accidental burns and fires.

In accordance with the invention described in copending, commonly assigned U.S. patent application Ser. No. 836,792, filed Mar. 6, 1986, it is possible to increase the luminosity of the flame obtained from solid trioxane fuel by adding thereto certain non-toxic sodium salts. Additionally, copending, commonly assigned U.S. patent application Ser. No. 836,889, filed Mar. 6, 1986, describes increasing the caloric content of trioxane fuels by adding thereto dialkyl ethers of alkanediols. By such improvements to trioxane heating fuels it is believed that these fuels will be more readily accepted as a convenient and safe portable energy source.

While the heat content of gelled fuels can be increased and the luminosity of the flame increased for improved safety such as just described for trioxane fuel, many gelled fuels are still particularly disadvantageous because such fuels readily evaporate, i.e, sublime, from the containers under normal atmospheric conditions. Accordingly, gelled fuels which are highly volatile must be kept in tightly sealed containers to prevent excessive loss by sublimation. A typical container or package for a solid or gelled fuel pellet comprises a metal film, such as aluminum foil wrapped tightly around the fuel pellet. Thus, to use the fuel, the metal foil must be unwrapped and the unwrapped fuel subsequently ignited. Unwrapping the tightly wrapped package prior to using the gelled heating fuel is an inconvenience. This lack of convenience is more readily apparent in military field applications where time, safety, and ease of comfort are important considerations.

A known method of packaging solid or gelled fuels, in particular, starter or decorative logs for fireplace use, comprises wrapping the log-shaped fuel in a combustible paper wrapper. To use such fuels, the paper wrapper is ignited, such as along an edge of the wrapper, and the solid log-shaped fuel is subsequently ignited by the flame from the packaging. The paper packaging is not removed prior to use. As discussed above, many gelled fuels and, in particular, gelled oxygenated hydrocarbon fuels evaporate from the containers even under normal atmospheric conditions. Accordingly, a paper covering or package for highly volatile fuels would be wholly unsatisfactory because such porous coverings would not prevent sublimation of the fuel. Moreover, it is unlikely that a paper package could be tightly wrapped around a gelled fuel pellet and the like to hermetically seal the fuel pellet to prevent sublimation.

It would be an obvious advantage if readily sublimable solid or gelled fuels could be hermetically packaged in a flammable wrapper. Accordingly, it is an object of the present invention to provide a combustible wrapper for solid or gelled fuels to eliminate the need for unwrapping the package to ignite the solid fuel. Another object is to package highly volatile solid or gelled fuels in a combustible wrapper which is capable of hermetically sealing the fuel to prevent sublimation.

These and other objects, aspects, and advantages of the invention will be readily apparent to those of ordinary skill in the art on consideration of the following description of the invention.

SUMMARY OF THE INVENTION

In accordance with the present invention, solid fuels in the form of tablets, pills, or the like are packaged in flammable, nonporous plastic films. The use of a flammable plastic film to package the solid fuel eliminates the necessity of unwrapping the package prior to igniting the fuel. Ignition of the solid fuel is simply initiated by igniting the novel package. The flame from the burning package subsequently ignites the solid fuel and both the package and fuel burn completely. It is important that the plastic film be flammable or capable of supporting a flame and does not merely melt away from a source of flame.

Besides being flammable, the use of plastic films as packaging for solid fuels is advantageous because such films can be produced as nonporous materials and are sufficiently flexible to tightly cover the shaped fuel. Moreover, plastic films, in particular, thermoplastic films can be sealed by heat such as by heat fusion or ultrasonic welding. Plastic films can thus form a hermetic barrier around the solid fuel and prevent losses by sublimation from highly volatile fuels.

DETAILED DESCRIPTION OF THE INVENTION

Figure 1:
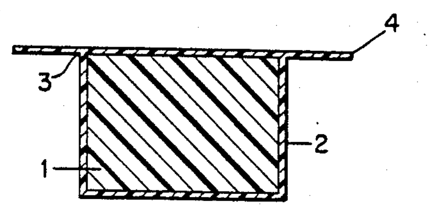
FIG. 1 is a cross-sectional view of a plastic film-wrapped solid fuel pellet in accordance with the teachings of this invention.

The invention is applicable to any of the solid or gelled heating fuels which are available. Such fuels can be formed from pure melts of the fuel which is then shaped and cooled, by gelling normally liquid fuels with the use of gelling agents such as metallic soaps and compacting normally solid powdered fuel. Additionally gelled fuels may be formed from liquid hydrocarbons and oxygenated hydrocarbons which are gelled in a polymeric matrix such as disclosed in U.S. Pat. No. 3,355,269, which patent is herein incorporated by reference. Thus, among the oxygenated hydrocarbons which can be gelled include ethyl acetate; 1,4-dioxane; 1,3-dioxolane; diethyl carbonate; diethyl ether of ethylene glycol; dimethyl ether of diethylene glycol; trioxane; propyl acetate; butyl acetate; amyl acetate; hexyl acetate; methyl propionate; methyl butyrate; ethyl formate; diethyl ether of diethylene glycol; diethyl formyl; dimethyl acetal; and the like. Liquid hydrocarbons which may be gelled include saturated hydrocarbons preferably not having more than 10 carbon atoms and which have a boiling point of at least about 35° C. to avoid excessive losses by evaporation. Such examples of preferred liquid hydrocarbons include heptane, octane, cyclohexane, methyl cyclohexane, dimethyl cyclohexane, and gasoline fractions of saturated aliphatic and fully hydrogenated cycloaromatic compounds. Preferred heating fuels include normally liquid hydrocarbons which are gelled in some manner and meltable fuels such as trioxane which can be formed from a pure melt or from compacting the dry solid with compaction aids such as metal stearates and organic binders.

The particular shape of the gelled fuel is not critical. Thus, gelled fuel in the shape of bars, pellets, candles, etc. are useful examples. As can readily be determined, the gelled fuel can be shaped to fill various domestic needs. For example, for outdoor use such as in camping, the gelled fuel can be shaped in pellet form for use in cooking such as heating water or other prepared foods. Additionally the gelled fuel can be in the shape of cylinders or candle-like form to provide heat and/or light. Similarly, the fuel can be shaped for use in the household such as in candle form to provide light as well as in the larger log form as a starting log for fireplace use or for providing a decorative fire for light and heat. A preferred form of gelled heating fuels is as a portable heat source in which the gelled fuel is in the shape of 10 to 30 gram pellets which can be used such as in the outdoors for camping as well as for the heating of field rations in military applications.

The particular chemical composition of the plastic film which forms the barrier wrap packaging of the present invention can be any of many synthetic resins which are flammable. By flammable is meant that the plastic should support a flame and not merely melt away from a source of flame and that it ignites easily and burns rapidly. Additionally, the plastic film is preferably substantially nonporous so as to be capable of preventing excessive evaporation of those gelled fuels which readily sublime under normal atmospheric conditions, i.e., temperatures of about 25° C. Among examples of useful plastic films include polyacetal resins, cellosics, including cellulose nitrate, cellulose butyrate, cellulose acetate and cellulose proprionate.

Polyacetal engineering resins, i.e., oxymethylene polymers, are the preferred material for forming the flammable barrier wrap in accordance with the present invention. The oxymethylene polymer which can be used to form the barrier wrap of the present invention is well known in the art. The polymers are characterized as having recurring oxymethylene groups or units, i.e., $-CH_2O-$. The term oxymethylene polymer as used herein is intended to include any oxymethylene polymer having $-CH_2O-$ groups comprising at least about 50 percent of the recurring units, for example, homopolymer, copolymers, terpolymers and the like.

Typically, the homopolymers are prepared by the polymerization of anhydrous formaldehyde or by the polymerization of trioxane which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in application Ser. No. 691,143, filed Oct. 21, 1957, by Hudgin and Berardinelli.

The homopolymers are usually stabilized against thermal degradation by end-capping or the incorporation therein of stabilizer compounds such as described in U.S. Pat. No. 3,133,896 to Dolce and Berardinelli.

Oxymethylene polymers that are particularly adapted for use in the barrier wrap of the present invention are oxymethylene copolymers, which may be prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Especially suitable oxymethylene copolymers which may be used in the barrier wrap of the present invention usually possess a relatively high level of polymer crystallinity, i.e., about 70 to 80 percent. These preferred oxymethylene copolymers have repeating units which consist essentially of (a) $-OCH_2-$ groups interspersed with (b) groups represented by the general formula:

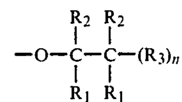

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The $-OCH_2-$ units of (a) constitute from about 85 to about 99.9 percent of the recurring units. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

In general, the cyclic ethers employed in making the preferred oxymethylene copolymers are those represented by the general formula:

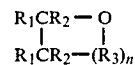

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive.

The preferred cyclic ethers used in the preparation of the preferred oxymethylene copolymers are ethylene oxide and 1,3-dioxolane, which may be represented by the formula:

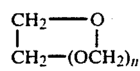

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers produced from the preferred cyclic ethers have a structure composed substantially of oxymethylene and oxyethylene groups in a ratio of from about 6 to 1 to about 1000 to 1.

With respect to the oxymethylene terpolymer, it may be prepared, for example, by reacting trioxane and a cyclic ether and/or cyclic acetal such as in the preparation of the oxymethylene copolymer, with a third monomer which is a bifunctional compound such as a diglycide of the formula:

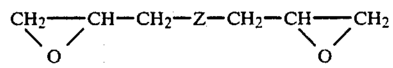

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclohexane-1,4-diol and 2-dimethyl-4-dimethyl-cyclobutane-1,3-diol, with butanediol diglycidyl ethers being most preferred.

Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

It is within the ambit of the present invention to use oxymethylene polymers that include, if desired, plasticizers, formaldehyde scavengers, lubricants, antioxidants, fillers, colorants reinforcing agents, light stabilizers, pigments, other stabilizers, and the like.

The synthetic resin is converted into a film or sheet by conventional molding techniques such as by extrusion. The film or sheet which is formed into the barrier wrap of the present invention will have a thickness of from about 0.5 micron to about 200 microns. The package is formed by simply wrapping the film around the gelled fuel and sealing the film around the fuel composition by heat fusing or ultrasonic welding of the film surfaces.

The flammable, nonporous wrap for the solid or gelled fuel composition can be structured so as to improve the ease of use of the package. For example, FIG. 1 illustrates an embodiment of the novel packaging of the present invention wherein one or more edges of the flammable film extend past the plane of the fuel and serve as a point or points of ignition of the packaged fuel. Thus, in FIG. 1, the solid or gelled fuel is indicated by reference numeral 1 and the flammable plastic packaging material indicated by reference numeral 2. The plastic film 2 is sealed around fuel 1 at fusion points 3 such as by heat fusion, ultrasonic welding, and the like. At least one edge 4 of plastic wrap 2 freely extends beyond the mass of fuel 1 so as to serve as an ignition point on the packaged fuel. Once edge 4 is ignited, the full film ignites which subsequently ignites the solid fuel and both solid fuel 1 and plastic film 2 burn.

Figure 2:
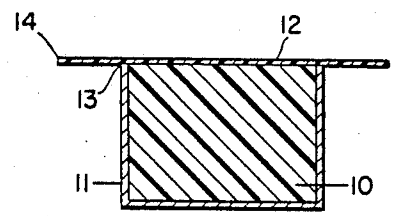
FIG. 2 is a cross-sectional view of an alternative plastic-wrapped solid fuel pellet.

An alternative package is shown in FIG. 2 in which the solid or gelled fuel 10 is sealed between a bottom container 11 such as formed from a metal foil including aluminum foil and a top covering 12 which is formed from the flammable plastic film as previously described. The plastic film can be sealed to the metallic foil at points 13 such as by heat fusion or ultrasonic welding as described for the embodiment in FIG. 1. Again, at least one edge 14 of film 12 should freely extend beyond the mass of mass of fuel 10 for ease of igniting the packaged fuel. In this embodiment, the metal foil 11 serves as a support for the burning fuel. The support can further act as a heat reflector if folded around the pellet of fuel in a cup shape to cover the bottom and a plurality of the sides of the fuel as shown in FIG. 2 to concentrate the flame and heat from the burning fuel.

What is claimed is:

1. A packaged solid or gelled heating fuel comprising: a shaped solid fuel formed from a normally liquid fuel or a meltable fuel, and a flammable plastic film wrapped around said shaped fuel, at least one edge of said plastic film extending freely beyond the mass of said shaped fuel to provide an easily accessible ignition point for said packaged fuel.

2. The packaged fuel of claim 1 wherein said plastic film is nonporous.

3. The packaged fuel of claim 1 wherein said fuel is sublimable at temperatures of about 25° C.

4. The packaged fuel of claim 1 wherein said plastic film comprises a polyacetal resin film.

5. The packaged fuel of claim 1 wherein said plastic film has a thickness of from about 0.5 micron to about 200 microns.

6. A packaged solid fuel comprising: a shaped solid fuel of trioxane and a polyacetal resin film wrapped around said trioxane fuel.

7. The packaged fuel of claim 1 further including a support for said shaped fuel, said support being bonded to said plastic film to seal said fuel between said support and said plastic film.

8. The packaged fuel of claim 7 wherein said support is a metal foil.

9. The packaged fuel of claim 8 wherein said metal foil is aluminum foil.

10. The packaged fuel of claim 8 wherein said support is a cup-shaped support adjacent to the bottom surface of said fuel and to a plurality of side surfaces and is bonded to said plastic film which is adjacent the top surface of said fuel to seal said fuel between said plastic film and said support.

11. The packaged fuel of claim 1 wherein said solid fuel is a trioxane-based fuel.

12. The packaged fuel of claim 11 wherein said solid fuel is in the shape of 10 to 30 gram pellets.

13. A packaged solid fuel comprising: a shaped solid fuel formed from a normally liquid fuel or a meltable fuel, and a polyacetal resin film wrapped around said shaped fuel, said polyacetal resin having at least 50% of recurring —$CH_2O$— units.

14. The packaged fuel of claim 13 wherein at least one edge of said film freely extends beyond the mass of said fuel to provide an easily accessible ignition point.

15. The packaged fuel of claim 13 further including a support for at least one surface of said fuel, said support being bonded to said plastic film so as to seal said fuel between said support and said plastic film.

16. The packaged fuel of claim 15 wherein said support is a cup-shaped support covering at least the bottom surface of said fuel and a plurality of side surfaces and is bonded to said plastic film which is adjacent the top surface of said fuel so as to seal said fuel between said support and said plastic film.

17. The packaged fuel of claim 13 wherein said fuel is trioxane.

18. The packaged fuel of claim 13 wherein said polyacetal resin film has a thickness of from about 0.5 micron to 5 microns.

19. The packaged fuel of claim 6 further including a metallic foil support on at least one surface of said shaped fuel, said support being bonded to said resin film so as to seal said fuel between said support and said resin film.

20. The packaged fuel of claim 6 wherein at least one edge of said resin film extends freely beyond the mass of said shaped fuel to provide an easily accessible ignition point for said packaged fuel.

* * * * *